Jan. 6, 1931.  R. J. NORTON  1,788,319
BRAKE SHOE STRUCTURE
Filed May 6, 1929
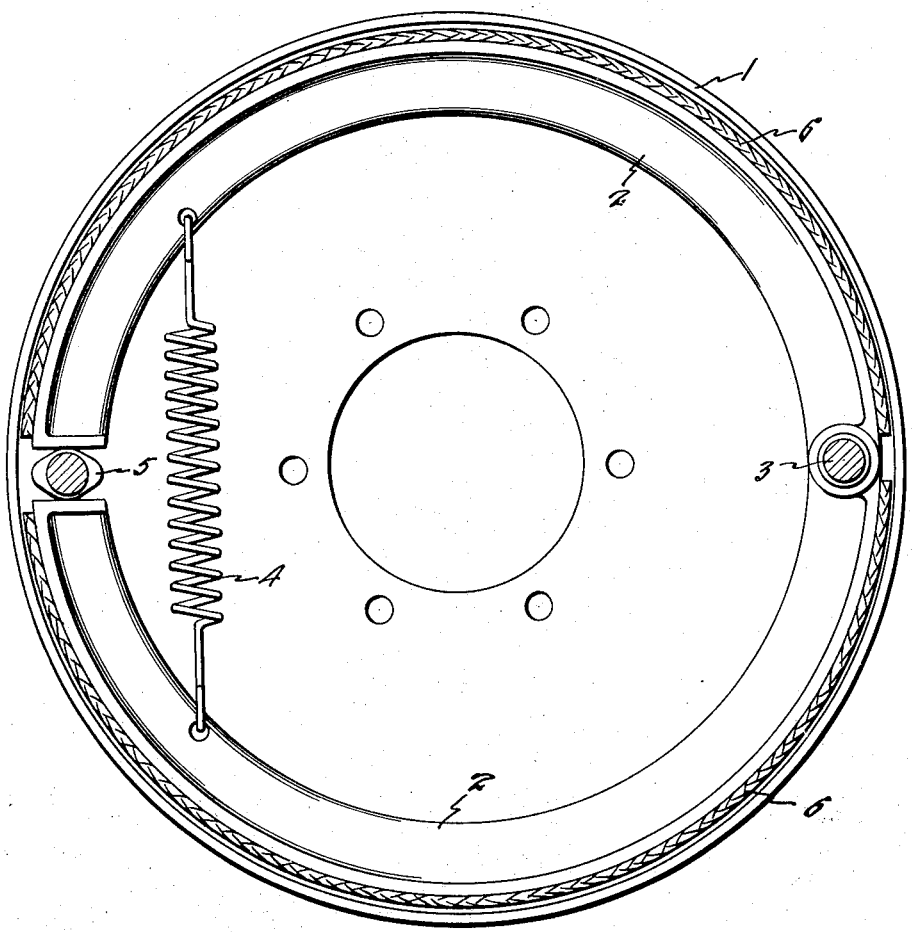
Inventor
RAYMOND J. NORTON
By Semmes + Semmes
Attorney Patented Jan. 6, 1931

1,788,319

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE-SHOE STRUCTURE

Application filed May 6, 1929. Serial No. 361,013.

This invention relates to friction facings.

The usual type of brake comprises either an internal expanding shoe or an external contracting strap to which is attached a friction facing. Since the advent and high development of the servo and duo servo types of brake, the coefficient of friction of the friction facing has become of paramount importance. Due to the accelerated response and large power multiplication of such types of brakes, it has become desirable to choose friction material having a relatively low coefficient of friction.

The purpose of the present invention is to provide a friction material which is adapted to be attached or molded to the shoe, and which will present a surface having the desirable hardening properties and in addition a relatively low coefficient of friction.

In order to make the invention more readily understood I have shown in the accompanying drawing a preferred form of it.

The single figure in the drawing is a cross sectional elevation of a typical brake apparatus utilizing my novel friction facing.

The invention broadly comprehends the idea of utilizing the present materials, that is to say, the materials now usually employed, and by a suitable treatment to reduce the coefficient of friction below that which would normally obtain.

More specifically the invention includes the provision of a friction material having a low coefficient of friction which is preferably made up by providing a permanently lubricated facing. This may be done by impregnating suitable fibrous material, such as asbestos, cellulose products, etc., with a suitable lubricant, and with the components of a synthetic resin. Upon reaction of the components of the resin, in the manner well known to those skilled in the art, an infusible substance may be produced which comprises a synthetic resin with which is permanently incorporated a predetermined amount of a lubricant.

The operation may be carried out by treating relatively thin sheets of the fibrous material and then building up a number of these to form an integral laminated structure.

The friction material of the present invention may be made up in the manner described in co-pending application Serial No. 324,361, filed December 7, 1928, of which the present application is a continuation in part.

As pointed out in that application, the preferred resin which is employed is a condensation product of furfural and phenol. This material is chosen because of its high reactivity, and particularly the ease with which it may be molded in a metal matrix.

In carrying out the invention a strip of asbestos or a cellulose product of low or negligible flammability may be treated with a lubricant, such, for example, as the oleaginous materials, paraffin, lanum, linseed oil and neat's-foot oil. The lubricant may first be dissolved in a suitable solvent, such as benzol, and the solution used to impregnate the fibrous core. If desired, the impregnation may be facilitated by the use of a suitable introfier, that is, a substance which assists in the penetration of the impregnating substance by modifying its capillary action or relative fluidity, etc., or by carrying out the impregnation under reduced pressure. Also, if desired, the fibrous material may first be gently heated and submitted to a vacuum in order to more or less completely evacuate the pores or interstices to accelerate subsequent penetration by the lubricant.

After the initial treatment of the filler material with the lubricating substance, it may then be treated with a solution of a fusible resin in a suitable vehicle or solvent. This solution also contains a hardener. As is known, upon the application of sufficient heat and pressure to these potentially reactive substances, a further reaction ensues with the formation of an infusible product.

The fusible form of the resin may first be made up by reacting the proper amounts of furfural and phenol in the presence of a suitable catalyst, such as hydrochloric acid. As in the usual case of making up a fusible form of the resin, the amount of furfural formaldehyde, or equivalent substance, which is employed is insufficient to form the infusible resin. These substances are then allowed to react under the proper thermal conditions.

After the formation of the fusible form of the resin, the water may be removed and the mass distilled with steam to remove the excess of phenol.

This fusible gum or resin may then be dissolved in a suitable solvent, such as alcohol, acetone, etc. To this solution of the resin there may then be added a suitable quantity of a hardening agent, which will react with the fusible form of the resin to form the infusible product. When furfural is employed the hardening agent may be an additional amount of furfural and ammonia, or furfuramid. In place of the furfural, or its derivative, other hardeners, such as hexamathylenetetramin, paraformaldehyde, etc. may be used.

While a furfural condensation product is given as a typical and preferred form of invention, it is to be understood that this is merely an example of any form of infusible synthetic resin. Instead of a furfural condensation product, there may be employed the phenol formaldehyde condensation or the acetylene condensation products.

The potentially reactive composition which comprises a solution of the fusible gum, with which is associated a suitable hardener, is then used as an impregnant for the pretreated fibrous filling material. As pointed out above, the impregnation of the fiber may be carried out under any of the well known accelerating conditions. After the desired impregnation of the fiber has been accomplished, the material may then be placed in a mold and heated to initiate and accelerate the final reaction, with the resultant formation of the hard set infusible resin. It will be understood that the quantity of hardening agent employed, and the temperature and pressure conditions of the treatment may be varied, depending upon the degree of infusibility and hardness which is desired.

It will be understood that the material comprising a fibrous filler and a dispersed condensation product may be molded directly on the brake shoe, as pointed out in the copending application Serial No. 324,362, filed December 7, 1928. Also, if desired, the facing may be made up as a separate element, and then attached to the shoe by any suitable means.

After the described treatment, the resultant product comprises a permanently lubricated resin. As already indicated, this may be made up in the form of relatively thin strips. If such is the case, these may be built up to the desired thickness and then treated with additional quantities of the potentially reactive infusible form of the resin. Upon the application of heat and pressure, the separate laminae may be permanently bonded together. Also, if desired, the material may be made up initially of the desired thickness by impregnating superimposed layers of the fiber with the synthetic gum in the plastic form. These several layers may then be subjected to heat and pressure in a mold to cause complete reaction and the formation of the infusible product.

It will be understood that the fibrous material may comprise a woven asbestos tape, such as is generally employed in brake linings, or it may comprise a short staple felted asbestos product. However, as pointed out the invention is not limited in its use to asbestos. It is equally applicable when the filler member comprises a cellular product which is of desirable low flammability, such, for example, as the ordinary cellulose products treated with suitable silicates.

It will be appreciated that the invention is susceptible of a wide range of refinements. For example, the fibers may be impregnated with the lubricant in a number of ways. The fibrous material, in the form of a tape or felted matting, may be immersed in a solution of the lubricant in the manner described. However, if desired, the lubricant in liquid condition may be made up in the form of an emulsion which, if desired, may be first run through a colloid mill so as to obtain a greater subdivision of the dispersed phase. It is to be understood that the process outlined comprehends any and all such described or equivalent methods of carrying out the major steps of the operation.

The drawing shows a typical brake structure comprising a brake drum 1 within which are mounted the shoes 2. These may be anchored by means of the member 3, secured to the usual backing plate. The shoes are held in inoperative or retracted position by means of the return spring 4 and are spread apart by suitable spreading means such as the cam 5. My novel friction facing 6 is mounted upon the shoes in my well-known manner and upon actuation of the cam 5 engages the drum. During the life of the lining a smooth non-gripping application of the brake is insured.

While there are described several specific embodiments of the invention, it is to be understood that these are given merely by way of example for, as pointed out, the particular methods disclosed may be greatly modified, within the scope of the principles involved. Hence, it is not intended that the invention shall be limited to the descriptive matter set forth in the specification, except as such limitations are clearly imposed by the appended claims.

I claim:

1. A brake apparatus comprising a drum, a friction means comprising a permanently lubricated synthetic resin within the drum, and means to move the friction means into engagement with the drum.

2. A friction facing comprising a fibrous material treated with an oleagenous material and bonded with a resin.

3. A friction facing comprising a fibrous material impregnated with an oleagenous material and permanently bonded with an infusible resin.

4. A friction facing comprising a permanently lubricated resin.

5. A friction material comprising a permanently lubricated synthetic resin.

6. A friction material comprising a phenolic condensation product having a lubricant permanently incorporated therein.

7. A friction material comprising a fibrous material impregnated with an oleagenous substance and bonded with a phenolic condensation product.

8. A friction material comprising a furfural condensation product having a lubricant incorporated therein.

9. A brake apparatus including a rotor and a friction facing adapted to engage the rotor comprising a permanently lubricated synthetic resin.

In testimony whereof I affix my signature.

RAYMOND J. NORTON.